Figure 17:
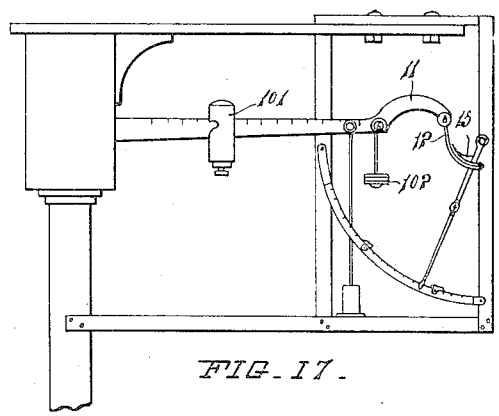

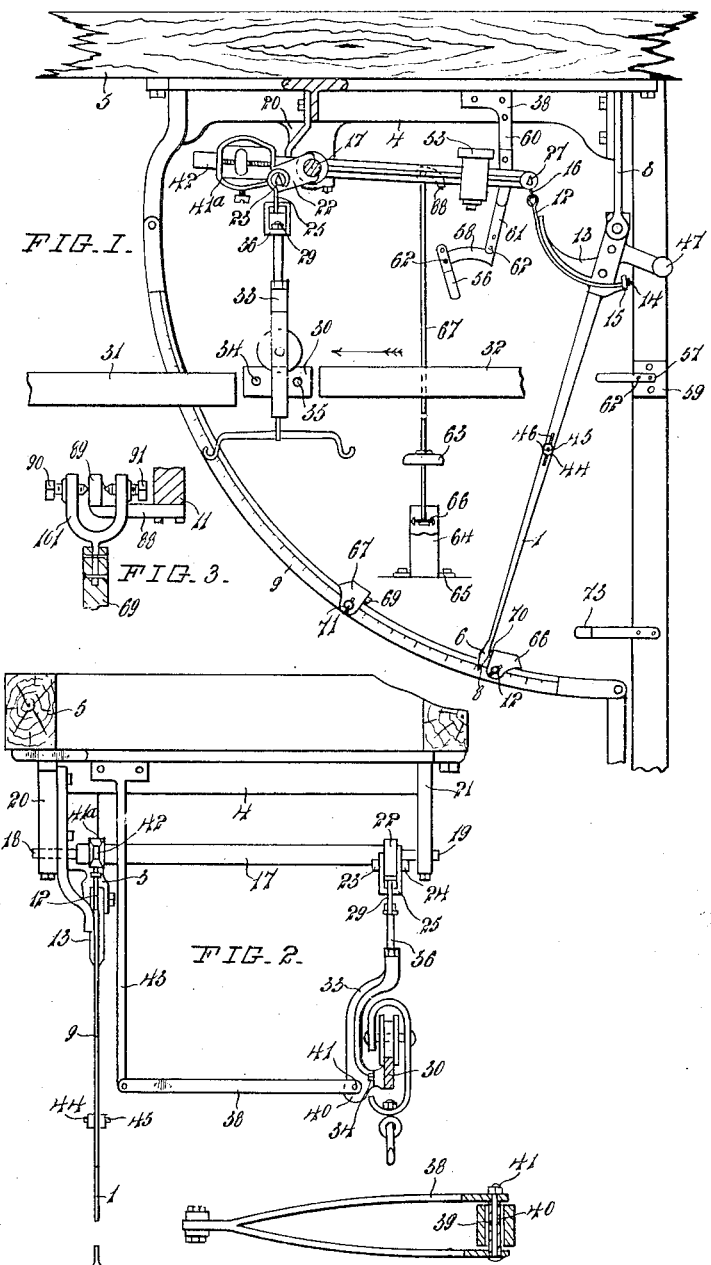

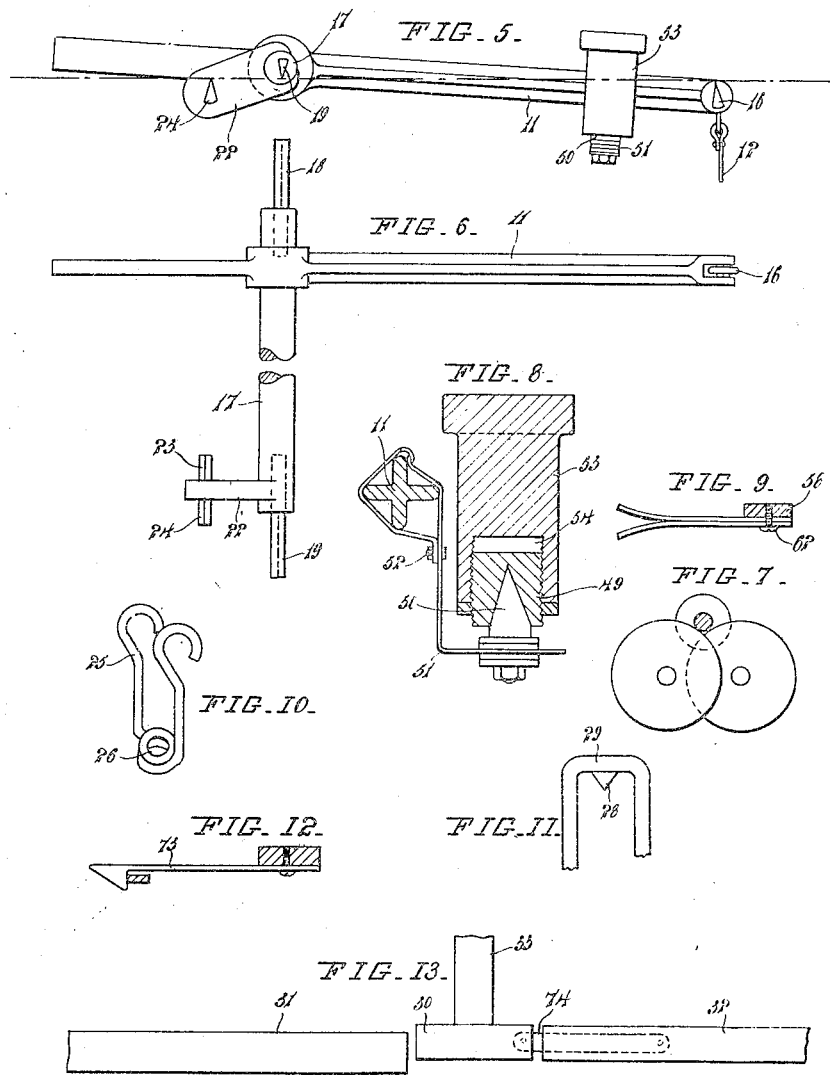

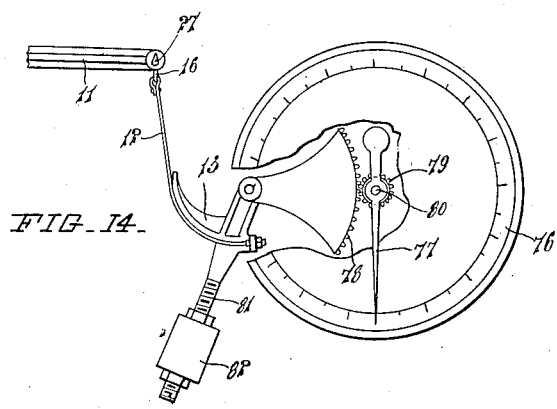
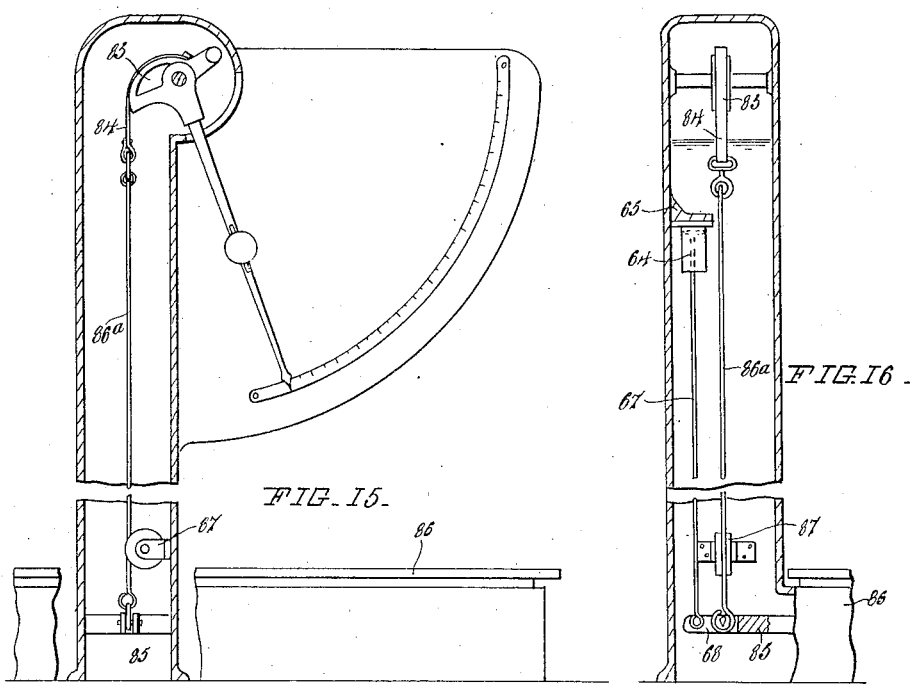

UNITED STATES PATENT OFFICE.

GEORGE HUTCHINSON, OF WELLINGTON, NEW ZEALAND.

WEIGHING APPARATUS.

1,147,400.  Specification of Letters Patent.  Patented July 20, 1915.

Application filed June 23, 1909. Serial No. 503,933.

*To all whom it may concern:*

Be it known that I, GEORGE HUTCHINSON, a subject of His Majesty the King of Great Britain and Ireland, residing at 215 Lambton Quay, Wellington, in the Provincial District of Wellington, in the Dominion of New Zealand, have invented certain new and useful Improvements in Weighing Apparatus, of which the following is a specification.

This invention relates to apparatus used for weighing articles and provides details of construction whereby accuracy and efficiency of the apparatus is attained and increased.

Scales have been in use in which a beam is connected by a link to a pivoted pointer adapted to indicate upon a graduated arc the weight of an article suspended upon the beam and it is to this class of weighing apparatus that my improvements are more particularly applicable.

According to my invention, the pointer made in the form of a heavy arm having a pointed end is made to indicate weights upon an arc divided into equal parts, whereas in the scales at present in use the divisions are unequal.

Instead of connecting the beam of the apparatus to the pointer by a link, I employ a strap such as a length of clock spring, one end of which is attached to the end of the beam and the other end is connected to a curved arm or cam, to which the pointer is fixed. The curve of this cam may be determined experimentally by taking a given weight and marking the distance to which the pointer is deflected from zero and so shaping the curve that multiples of that weight will bring the pointer to indicate multiples of the distance obtained by the initial weight. The connection of the strap to the cam may have adjusting means such as a screw and thumb nut, whereby the lever may be brought to the best working angle relatively to the pointer.

The apparatus is admirably adapted for weighing carcasses in abattoirs and similar places, where a section of an overhead track is intercepted to form part of a weighing apparatus. In this case I provide means for preventing the section of the track from twisting unduly and at the same time leaving it free to rise and fall. The means consist of a bifurcated arm pivoted to a pin passing through a bracket upon the back of the section, and provided with a ferrule around the pin, whereby the arm may be tightened to the ferrule without being tightened upon the bracket. The other end of the bifurcated arm is pivoted to a rigid arm depending from the apparatus or to any other convenient part. To provide compensation for errors arising from possible defective workmanship or from wear and tear, an adjustable spacing weight is provided upon the pointer. By moving this weight relatively to the tip of the pointer the center of gravity of the pointer is changed as required to give accurate readings upon the dial. I suspend the said section of the track upon a double hook provided with a cup and engaging knife edged pins projecting from the lever. A cone provided upon a link fits into the said cup, and the section of the track is attached by a bracket and bolt to the link. Any slight twisting or other movement of the said section of the track, not prevented by the bifurcated arm, or by other means, is absorbed by the cone and its cup, and wear and tear of the knife edged pins is avoided.

To counter balance the cam so that the center of gravity of the pointer may lie accurately along a line drawn from the center of suspension to the tip of the pointer, I provide a counter weight integral with the said cam and located upon the opposite side of the center of suspension. This counter weight is also employed for contacting with a buffer spring to absorb vibration when the weight is removed from the apparatus. The pointer, cam, counter-weight and spacing weight constitute a deflection weight mounted upon and removable with its spindle.

In modification of the invention, instead of making the dial plate as an arc, I use a circular dial and operate its pointer by a curved rack and pinion, the original pointer then becomes a weighted arm which is deflected by the article to be weighed overcoming the gravity of the said arm, the article acting through the strap and cam as previously described. The cam may be modified as required to adapt the apparatus for platform or other forms of weighing machines.

The initial weight which the apparatus will indicate may be changed by applying a weight to the beam with means for adjusting its horizontal position thereon. Such means may consist of a screw passing through the weight and screwing into a stud let into the weight and engaging a notch in the beam. A vertical weight is also adjustable upon this weight for the purpose of maintaining the center of gravity of the beam accurately along a straight line touching the points of its three knife edged pins.

To prevent inordinate vibration of the pointer and of the beam, I provide buffers as required, also a dash pot in conjunction with either or both of these parts, and when a number of articles of approximately the same weight are to be weighed I provide stops or buffers for the pointer at the limits of the range required to weigh such articles. Time is thus saved by preventing unnecessary vibration of the pointer.

To prevent friction upon the ends of the intercepted section of the track I pivot the said section to the track.

The drawings herewith illustrate the invention.

Figure 18:
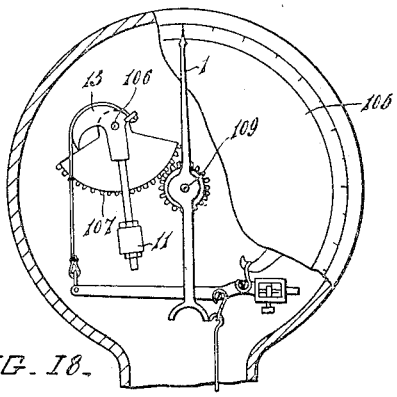

Figure 1, is a front elevation, and Fig. 2, a side elevation of the invention applied to abattoir scales, Fig. 3, an end elevation of means for connecting the rod of a dash pot to a scale beam, Fig. 4, a plan of a bifurcated arm, Fig. 5, a front elevation, and Fig. 6, a plan of a scale beam, Fig. 7, a front elevation of friction wheels, Fig. 8, a side elevation of a vertical weight, Fig. 9, a plan of a buffer, Fig. 10, a perspective view of a double hook, Fig. 11, a front elevation of part of a link, Fig. 12, a plan of a spring catch, Fig. 13, a front elevation of part of an overhead track, Fig. 14, a front elevation of a modified form of scales, Fig. 15, a front sectional elevation, and Fig. 16, a side sectional elevation of a platform scale embodying my invention, and Fig. 17, a front elevation of an ordinary platform scale embodying my invention, Fig. 18, a front elevation partly in section of a platform scale embodying a modified form of the invention.

Referring more particularly to Figs. 1 and 2 the pointer 1 is pivoted to a bracket 3 secured to the frame 4 of the machine, which is fixed to overhead framework 5. A bifurcated end 6 of the pointer terminating in points 7 and 8 indicates weights upon an arc or curved dial 9 marked upon both sides with divisions of equal length.

The pointer 1 is connected to a beam 11 by a strap 12, one end of which is connected to a ring 16 which enters a jaw upon the end of the beam and through which passes a knife edged pin 27. The other end of the strap 12 is attached to a cam 13 secured to the pointer. The connection of the strap to the cam may have adjusting means consisting of a screw 14 passing through a lug 15 integral with the cam and attached to the strap, and of a nut screwed upon the screw 14 and bearing against the lug 15.

The beam 11 is fixed to, or made integral with, a shaft 17 having knife edged terminals 18 and 19 mounted in bearings 20 and 21 made integral with the frame 4. The shaft has a short arm 22 on the side remote from the beam 11, and knife edged pins 23 and 24 project from the sides of the said arm. A double hook 25, see Fig. 10, provided with a cup 26, engages the knife edged pins 23 and 24. A cone 28 provided upon a link 29 fits into the cup 26 and a section 30 of the overhead track 31 and 32 is attached to a bracket 33 by bolts 34 and 35, the bracket being connected to the link 29 by a bolt 36. Undue twisting or swiveling of the bracket 33 and the section 30 is prevented by bifurcated arm 38 provided with a ferrule 39 passing freely through a lug 40 formed upon the bracket, and with a bolt 41 passing through the arm and the ferrule, whereby the arm may be tightened upon the ferrule without gripping the lug 40. The other end of the arm 38 is pivoted to a rigid arm 45 depending from the frame 4. Any slight movement of the section 30 not prevented by the arm 38, is absorbed by the cone 28 moving in its cup 26.

The pointer is brought to zero by a weight 41ª adjustable upon an arm 42 fixed to or integral with the shaft 17.

A spacing weight 44 attached to the pointer 1 by a bolt 45 passing through the weight and a slot 46 is adjustable upon the pointer for the purpose of changing the center of gravity of the pointer as required to give accurate readings upon the dial 9. To counter balance the curved arm 13, so that, if the pointer were suspended freely, a vertical line would pass through the center of its pivot in the bracket 3 and through the points 7 and 8, I provide a counter weight 47 integral with the curved arm 13 and located upon the opposite side of the pivot of the pointer.

The initial weight which the machine will indicate may be changed by a weight 49, see Fig. 8, supported upon a pointed stud 50 projecting from a bracket 51 clamped to the beam 11 by a bolt 52. A vertical weight 53 having a recess 54 screwed to receive the screwed exterior of the weight 49 is adjustable in height for the purpose of adjusting the center of gravity of the two weights 49 and 53 viewed as one weight, accurately upon a straight line touching the points of the knife edged pins of the beam as shown by the dotted line in Fig. 5.

To prevent inordinate vibration of the pointer 1, I provide buffers 56 and 57 secured to any convenient part of the framework by brackets 58 and 59, and for a similar reason I provide buffers 60 and 61 to cooperate with the beam 11. These buffers, see Fig. 9, each consist of two springs united at one end to their supporting brackets by screws 62 and having their other ends diverging. Upon the pointer entering the buffers, its movement is arrested without jar to the parts, and rebound minimized.

Instead of buffers, or in conjunction therewith, a dash pot may be used, comprising a cylinder 64 secured to a fixed bracket 65 and fitted with a piston 66 fixed to a rod 67 passing through the end of the cylinder and connected to the beam 11. The air confined in the cylinder 64 or a vacuum behind the piston checks the movement of the beam prior to the air leaking past the piston 66. A shield 63 fixed to the rod 67 prevents dust and dirt from falling upon the cylinder 64.

When a number of articles of approximately the same weight are to be weighed, stops 67 and 68 provided with projecting rubber plugs 69 and 70, are provided upon the dial 9 and limit movement of the pointer 1 within the range required to weigh such articles, and thus facilitate rapidity of operation. The stops are adjustable upon the dial by thumb screws 71 and 72.

A spring catch 73, see Fig. 12, fixed to the frame work of the machine is adapted to hold the pointer from moving while articles to be weighed are being placed upon the machine.

To prevent the ends of the section 30 contacting with the fixed parts 31 and 32 of the track and thereby causing friction between these parts, I pivot the said section by a link 74 to the part 32, see Fig. 13.

In a modification of the invention, shown in Fig. 14, instead of making the dial as an arc, I use a circular dial 76, and operate its balanced pointer 77 by a curved rack 78 integral with the curved arm 13, and engaging a pinion 79 fixed to the spindle 80 of the pointer 77. The original pointer then becomes an arm 81 loaded with an adjustable weight 82, which is deflected by the article to be weighed overcoming the gravity of the said arm and weight, the article acting through the strap 12 and cam 13 as previously described.

Figs. 15 and 16 show the cam modified as required to adapt the apparatus for platform or other forms of weighing machine. In this case, the cam 83 is inverted and the band 84 connected to the usual lever 85 of a platform weighing machine 86 by a cord 86ᵃ. A guide roller 87 keeps the cord 86ᵃ truly vertical over the point of its attachment to the lever 85 whatever may be the position of the curved arm 83.

In Fig. 3 means are shown for attaching the rod 67 of a dash-pot to the side of the beam 11 and at a distance therefrom where it will not impede the movement of the pointer 1. A bracket 88 projecting laterally from the beam has an overhanging vertical member 89 provided with conical recesses adapted to receive conical ends of screws 90 and 91 screwed through the cheeks of a jaw 100 fixed to the rod 67. By adjusting the screws 90 and 91 the rod 67 may be moved laterally as required to bring it into alinement with the dash-pot.

Referring now to Fig. 17 the cam 13 is connected directly to the usual scale beam 11 by the strap 12. Similarly the form of the invention shown in Fig. 14 may be employed with an ordinary platform scale. The usual weight 101 is retained, but used for balancing the tare only, and the weights 102 serve the same purpose as the weight 49 previously described.

Fig. 18 shows the cam applied to a platform scale having a circular dial 105. The cam is inverted and upon its spindle 106 is fixed a curved rack 107 gearing with a pinion 108 secured to the spindle 109 of the vulcanized pointer 1. As in Fig. 14 the original pointer becomes an arm 110 loaded with an adjustable weight 111.

What I do claim and desire to secure by Letters Patent of the United States is:—

1. In a scale, the combination of a pivotally mounted beam, a pendulum-like member supported to rock about an axis in a horizontal plane below the beam, a cam extending from said member toward the beam, a strap having its lower end connected with said cam and passing upwardly thereover and its upper end connected with the beam, means for balancing said pendulum-like member, a poise weight adjustable longitudinally of the pendulum-like member, and an indicator comprising a series of graduations and a pointer which is connected with the pendulum-like member.

2. In a scale, the combination of a pivotally mounted load support, a pendulum-like member, a cam carried by said member, a strap connecting the cam and load support, a counterweight for the pendulum-like member connected thereto between the point of connection of the cam therewith and the pivot of said member, and an indicator adapted to be actuated by the pendulum-like member.

3. In a scale, a section of an overhead track, a bracket carrying the said section, a bifurcated arm pivoted at one end to the bracket, and a rigid arm to which the other end of the bifurcated arm is pivoted.

4. In a scale having a section of an overhead track and a beam, a double hook upon the scale beam having a cup, a link having a cone fitting the cup, a bracket attached to the link and carrying the said section, substantially as set forth.

5. In a scale having a dial marked with divisions of equal length, a pointer operating with the dial, a curved arm upon the pointer and a counterweight upon the side of the pointer remote from the curved arm substantially as set forth.

6. In a scale of the character described, the combination of an elevated sectional track, a beam connected with a section of the track adapted to move vertically relative to the adjacent sections, a graduated dial, a pointer connected with the beam and coöperating with the graduations on the dial to indicate weights, and means for limiting the turning movement about a vertical axis of the section of track connected with the beam.

7. In a scale of the character described, the combination of an elevated sectional track, a beam, means supporting one of the track sections arranged to be rocked by the beam, a relatively stationary fork engaging the track supporting means to limit lateral movement thereof without interfering with its vertical movement, and means indicating the extent of movement of the beam.

8. In a scale, the combination of a beam, a pointed pendulum, an indicating means adapted to be actuated therewith, a cam connected with the pendulum, means connecting said cam and beam, and a counterweight formed integral with the cam and adapted to balance the pendulum so that when freely suspended the point thereof will lie vertically below the axis.

9. In a scale, the combination of a pivotally mounted beam, a pendulum having a laterally projecting member and a counterweight connected therewith so that it is always below the line passing through the center of gravity of said lateral projection and the axis of the pendulum, means connecting the beam and laterally projecting members of the pendulum and an indicator adapted to be actuated by the pendulum.

In testimony whereof I have signed my name to this specification in the presence of two witnesses.

GEORGE HUTCHINSON.

Witnesses:
ERNEST SMITH BALDWIN,
ANNIE DOROTHY MCKENZIE.